United States Patent [19]

Korhonen

[11] 4,241,473
[45] Dec. 30, 1980

[54] OFF CONVEYOR-LINE MEAT-HANDLING APPARATUS

[76] Inventor: Kaarlo Korhonen, Säterwag 18, Stockholm, Sweden

[21] Appl. No.: 874,410

[22] Filed: Feb. 2, 1978

[30] Foreign Application Priority Data

Feb. 23, 1977 [SE] Sweden .............................. 7702030

[51] Int. Cl.³ .............................................. A22B 5/00
[52] U.S. Cl. ......................................... 17/24; 104/88; 104/97
[58] Field of Search ..................... 17/24, 44.2; 104/97, 104/88, 104

[56] References Cited

U.S. PATENT DOCUMENTS

| | | | |
|---|---|---|---|
| 2,772,797 | 12/1956 | Schreck | 104/97 X |
| 2,883,700 | 4/1959 | Liebmann, Jr. | 17/24 |
| 4,011,820 | 3/1977 | Bordenave et al. | 17/24 X |
| 4,015,538 | 4/1977 | Webb et al. | 104/97 |

Primary Examiner—Willie G. Abercrombie
Attorney, Agent, or Firm—Jon M. Lewis

[57] ABSTRACT

An off-conveyor line meat cutting and handling apparatus is used in association with a conveyor track on which carcasses for cutting are transported; each carcass is suspended from a hook which has a yoke-member and rollers to permit travelling along the conveyor track which may be an overhead monorail track. The apparatus functions as a wayside station and has an immovable stand as well as a receiving device which has means to grip the yoke member so as not to allow movement thereof in any horizontal direction nor in a vertically downward direction. The receiving device can be swung away from the track and has a locking device holding the yoke in a locking position until released manually. For convenience, the carcass can be rotated slowly along with the hook during meat-cutting, so as to obviate the operator going around the carcass. The hook with the suspended carcass may be physically swung away from the track on a receiving device of the apparatus for completing cutting, so that subsequent carcasses which may have other destinations can pass the region of the apparatus along the track unhindered. An optional downwardly extending member having nail-like projections facilitates additionally securing the carcass during cutting.

24 Claims, 3 Drawing Figures

OFF CONVEYOR-LINE MEAT-HANDLING APPARATUS

BACKGROUND OF THE INVENTION

This invention relates generally to apparatus for transporting and handling articles on conveyors and more particularly to a meat-cutting stand for use with apparatus for tansporting and handling carcasses in a slaughterhouse for facilitating cutting meat in various stages.

In slaughterhouses where cutting of meat from carcasses is done on mass scale, usually conveyors are used for transporting carcasses between stations where different portions of meat are cut. This invention provides an efficient and convenient meat-cutting stand for use with apparatus for handling carcasses which are transported on conveyor tracks.

DESCRIPTION OF PRIOR ART

In apparatus for cutting and handling meat, it is common and convenient to hang a carcass on a trolley or a hook suspended from wheels moving on a conveyor type monorail or an overhead track conveyor so that carcasses may be transported from one station to the next for meat-cutting and handling. This has been accomplished in prior art apparatus by lifting the meat cuts or carcass as the case may be, with overhead cranes, carrying the cuts in trucks or other vehicles and hanging them on hooks which move on rollers on an overhead track. Where hooks were used, they had the advantage of holding the carcass suspended for easy handling, but had to be removed from the overhead track manually or in other cumbersome manner lifted and placed away from the conveyor track in a special rack securely for cutting portions of meat from all around the carcass.

Various devices for handling articles carried on conveyors have been proposed in prior art, and one such example is a conveyor system disclosed in British Pat. No. 992,167 to Thibault. The patent to Thibault is directed to a device for coupling and uncoupling load carriers with and from trolleys at loading and unloading stations of a conveyor system; it also provides a load carrier with a free-swinging pivotal suspension both when positioned at a waiting station and when coupled to a trolley; further, since fragile loads are envisaged in the Thibault patent, in order to reduce any possible shocks or jolts to the load when loading and unloading are performed, camming ramps are provided in the direction of the trolley track to raise or lower the vertical height of the loads at appropriate locations. The Thibault patent is considered by the applicant to be non-analogous art far removed from the meat-cutting and handling field and is only presented for the purpose of illustrating the general state of the art in the conveyor-system art. Additionally, the conveyor system in the Thibault patent does not provide or suggest a positive locating and locking means for the load when it is taken off the track at a loading/unloading station. Such locking would be particularly necessary in the context of a slaughterhouse conveyor, where, at a cutting station, there is need for the load; i.e., the carcass on its "hook" or other means, to be held very firmly during cutting, so as to limit its degrees of freedom for movement. Especially with a heavy carcass, it is almost a matter of necessity to support not only the weight of the carcass when the "hook" is off the conveyor track, but also additionally support the hook and the carcass against possible vertically downward forces that may be exerted by an operator on the carcass while cutting meat therefrom.

Swedish Pat. No. 44193 discloses a transfer-device for automatically transferring suspended loads on cables; e.g., cable cars, from a sloping cable to another transport apparatus or conveyor which may be horizontal, and vice versa. The upper end portion of a sloping cable is divided into three branching cables which are used to guide different pulleys of the transfer-device which picks up and removes a cable car from the highest point of a sloping ropeway to a second transport conveyor. The act of transferring the cable car from one ropeway to a second conveyor in this prior art patent, however, is not associated with any gripping of the trolley hood or the cable car on a forklift member before transfer without preventing degrees of freedom in any horizontal direction. The transfer device of the Swedish Pat. No. 44193 therefore does not cater to the needs of the present invention.

German Pat. No. 206868 discloses an unloading device for articles or workpieces which are being transported assisted by rollers of a trolley and suspended from a monorail track. The workpieces are conveyed on hooks to an unloading station at a predetermined location on the track; the unloading device dislodges the workpieces from the hooks, letting the trolleys, together with the hooks, pass through the unloading station. There is no means provided to grip the workpiece when it is taken off the monorail track, nor can the workpiece be returned to the monorail track in a simple manner for further transportation.

The above two prior-art patents disclose nonanalogous art and do not contribute to the meat-cutting apparatus of the applicant's invention.

Prior art conveyor systems do not fully and efficiently cater to the specific need in a slaughterhouse, where, a carcass has to be mechanically taken off a conveyor track and held in a locked position at a cutting station adjacent to the track and has to be mechanically put back on the conveyor track for being transported to a subsequent station along the conveyor track for further cutting. In the meantime, when a particular carcass is being cut at a first wayside station, other carcasses which are travelling on the conveyor past the first wayside station should be able to travel unhindered. The present invention provides apparatus which satisfies the foregoing requirements in an efficient and convenient manner.

This invention provides a meat-cutting stand including a receiving and handling device in a (slaughterhouse) conveyor system which handles a plurality of loads suspended from hooks which travel on rollers on an overhead track, the hook preferably including a yoke member, the device comprising first and second guide bar means which guide the yoke member on either side thereof into a locking position of the yoke member, the device also comprising a third guide bar which engages the yoke member at the bottom thereof so as to vertically support the yoke member, the hook and the load (which may be a carcass). Advantageously, the device of the invention may include a pivoted locking member which can be pivotally moved into engagement with the yoke member in its locking position; the pivoted locking member in turn may be locked by a locking pin by an operator, so that the load (carcass) has no freedom of movement in any horizontal direction, nor in the vertically downward direction.

The invention also provides a meat-cutting stand of the aforesaid type including a hydraulic means to displace the load (carcass) together with a suspending hook in a receiving and handling device, so that the load may be taken off the conveyor track or placed on the conveyor track from a wayside position. To facilitate such an unloading and loading operation, the receiving device which is preferably cantilevered (and adapted at its free end to engage the yoke member in the region of the first, second and third guide members,) is pivoted for movement about a vertical axis at the fixed end thereof.

The invention additionally provides a meat-cutting and handling stand in association with the receiving device of the invention, the stand having hydraulic means to enable mounting thereof in a substantially vertical position at any desired location along the conveyor track and in between the conveyor track and the ground.

The invention further allows the operator to cut meat from a hanging carcass such that when cut from the top thereof, gravity pulls the meat down and away from the bones, thereby facilitating his task, increasing his production and improving the quality of the cuts of meat.

It has been found that slaughterhouses can increase their meat-cutting capacity and consequently the overall productivity in the order of about 30% by using meat-cutting stands which incorporate this invention, as compared to the productivity when using conventional methods and apparatus.

The receiving device may be provided with means to rotatably move the locked yoke member so that meat-cutting from a carcass suspended on a hook from the yoke member may be facilitated without the operator himself having to go around the carcass. Further, in order to secure the carcass to the receiving device firmly, a vertically depending rigid "holding bar" may be provided which has nail-like projections which bite into the carcass along the suspended height thereof.

SUMMARY OF THE INVENTION

The invention in its broad form resides in meat cutting apparatus in a slaughterhouse of the type where carcasses are transported suspended on hooks along a conveyor track using rollers, and meat is cut at a wayside meat-cutting station from a carcass which is taken off the conveyor track which has thereon other carcasses to pass through the location of said meat-cutting station, said apparatus comprising: a stand member which can be immovably mounted at a wayside station where meat is to be cut from a carcass; an elongated receiving device which cantilevers substantially horizontally from said stand member, to receive a carcass suspended from a hook which is adapted to be transported along the conveyor track, said receiving device having means to grip a hook which has a suspended carcass in a manner as to prevent movement of the hook in any horizontal direction and in a vertically downward direction; and pivot means to allow an arcuate movement of said receiving device about a vertical axis at the cantilevered end of the elongated receiving device, whereby the receiving device with the gripped carcass on the hook can be swung away from the conveyor track for cutting meat so that other carcasses on hooks can travel on the conveyor track to other wayside stations unobstructed.

The foregoing objects and other advantages of the present invention will be apparent from the following description of an exemplary embodiment, to be understood in conjunction with the accompanying drawing.

DESCRIPTION OF THE PREFERRED EMBODIMENT

Figure 1:
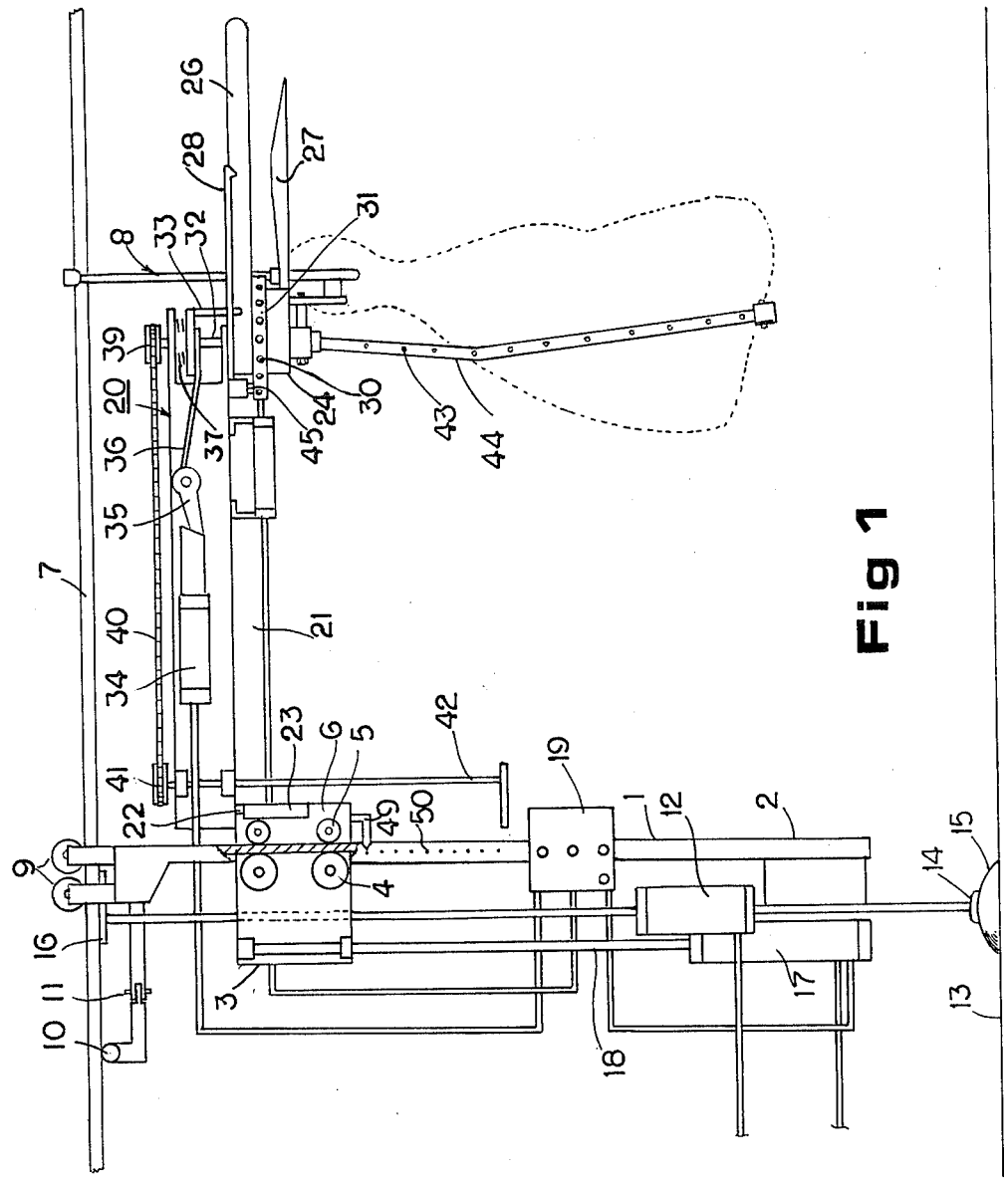
FIG. 1 is a sectional representation of a receiving device according to the invention in a meat-cutting station.

FIG. 1 illustrates generally an arrangement of a meat-cutting station comprising a conveyor track or rail 7 under which is mounted a stand 1 which supports the receiving device 20 embodying the invention. The stand 1, as shown for purposes of illustration, consists of two vertical channel irons spaced apart and facing in the same direction. The stand is mounted in place by means of a double-acting hydraulic means 12; a suction cup 15 and a ball and socket joint 14 facilitate the erection of the stand, which at its top has a pad 16 supported under the rail 7, and a support wheel 10, as well as guide wheels 9. In order to enable the stand to be located even at stations where the track may be turning around in a bend, a pivot 11 is provided as shown in conjunction with the support wheel 10.

A cart 3, comprising plate 6 and equipped with wheels 4, 5 can slide vertically up and down along the channel iron members 2. The wheels 4, 5 are disposed to engage the opposite sides of each channel web.

The carcasses or meat pieces to be cut and handled are transported suspended from a hook 48 (FIG. 3) which depends upon a yoke member 47 (FIG. 3) which is provided with rollers 46 which engage the rail or track 7 of the conveyor.

Figure 3:
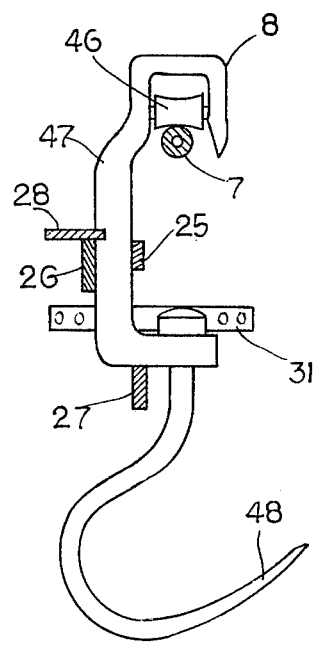
FIG. 3 is a diagrammatical cross-sectional view along line 111—111 in FIG. 2.

The device of the invention is generally shown at 20 in FIG. 1, and will be referred to as the "receiving device" hereinafter. The receiving device 20 extends in a cantilevered fashion from cart 3, and includes a beam member 21 which is capable of hinged arcuate movement at its fixed end, by virtue of an axle 22 in a hinge-means 23. The beam 21 extends substantially horizontally, and is perpendicular to the direction of movement of the cart 3. At the free end of the beam 21 is a guiding device 24 which is capable of rotary movement about a vertical axis. The guiding device 24 has attached thereto two lateral guide bars 25, 26, which, as illustrated in FIG. 3, may have diverging free ends and portions which are parallelly spaced and fastened to the guiding device 24. A third guide member 27 is substantially also a cantilevered member like 25, 26, but is disposed to supportingly engage the bottom of the yoke 47; guide bars 25, 26 on the other hand are disposed to restrictively engage the sides of the yoke member 47 so as to restrict any horizontal movement of the yoke in one direction. The guide bar 27 is disposed at a level lower than that of the guide bars 25, 26, and is designed to withstand the vertical load of the carcass on the hook, and can withstand possible vertically downward thrusts that may occur when the operator handles the carcass for cutting meat.

Figure 2:
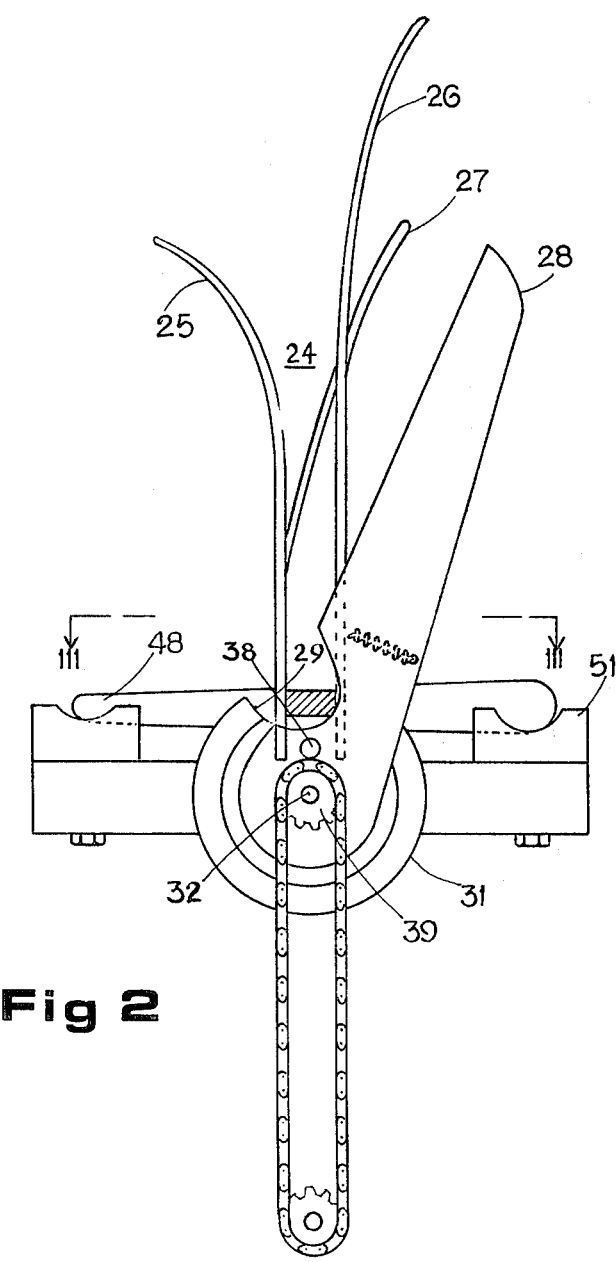
FIG. 2 is a partial diagrammatical sectional view of the front part of the device seen from above.

As shown in FIG. 2, the receiving device 20 is also provided with a locking plate 28 which is advantageously spring-loaded or biased and so designed as to keep the yoke 47 and the hook 48 locked in a slot 29 in a disc 31. The slotted disc 31, together with the guiding device 24, is capable of pivoted movement about a vertical axis through axle 32. The disc 31 together with the guiding device 24 is capable of rotary movement, and can be locked in any desired rotary position by means of a horizontally moving lock pin which can engage in hole 30, so that an operator can get to different parts and sides of the carcass. The guiding device 24 and disc 31 can be made to revolve round the axle 32 by a transfer chain 40 driven by axle 42, thus making the job easier for the operator who is cutting the meat, by obviating the need to walk around the carcass. To this end, on the upper protruding end of the axle 32 there is provided a chain wheel 39, which via the transfer chain 40, a second wheel 41 and the axle 42, makes it possible for the entire guiding device 24 to revolve around axle 32. The transfer chain 40 may be moved manually by a handle operating the axle 42, or the movement may be mechanized if desired.

In order to further secure the carcass when a meat-cutting operation is in progress, a rigid holding bar 44 having a plurality of projections 43 which can bite into the carcass, is provided. This prevents the carcass from turning around when cutting is in progress.

To balance the axle 32, a backup roller 45 may be used to work in conjunction with the disc 31.

The locking plate 28 per se can freely rotate about axle 32 and is independent from the disc 31 and the guiding device 24 except when it is locked in position by means of pin 33. The pin 33 may be disengaged by means of hydraulic piston device 34 against the spring bias of springs 37, which tend to retain the pin 33 in the aperture 38 in the disc 31. In the locked position of the yoke 47, a part of the hook 48 is made to bear on a pair of pads 51 so as to prevent the carcass tending to slide off the hook. With the carcass thus secured on the receiving device, the cart 3 is moved up by means of hydraulic cylinder 17 to lift the receiving device 20 and consequently the upper portion 8 of the yoke 47 off the track rail 7. The beam 21 together with the guiding device 24 is then swung aside from the track rail to the location of the cutting station, so that other carcasses advancing along the conveyor track can advance to their destinations along the conveyor unhindered.

When the operator is done with a carcass at a particular cutting station, the carcass may then be put back on the conveyor track 7 simply by swinging the receiving device 20 which is hinged at 23 back to the location of the track 7 in the proper direction. By this action, the beam 21 and the guiding device 24 together with the carcass along swing back to the track 7. After aligning the roller 46 on the track 7, the cart 3 is lowered and the lock plate 28 is released to free the yoke to be transported on track 7 once again.

FIG. 3 shows the upper part 8 of the yoke 47, and the vertical portion of the yoke being engaged by guide bars 25, 26 and 27 and lock plate 28. This is the position which the yoke assumes before the carcass is lifted off the track 7.

It is expedient that the receiving device 20 is raised by means of the cart 3 (and hydraulic device 17 and shaft 18) to a predetermined height which is exactly adjusted to receive the yoke 47 advancing on the track 7. To facilitate the correct vertical adjustment of the receiving device there is provided an indicator 49 on plate 6, which slides on markings or graduations 50 on one of the channel irons 2. When the hook 48 with the yoke 47 arrives at the receiving device, the various guide bars 25, 26 and 27 guide the hook 8 towards the circular disc 31 whose slot 29 engages the lower part of the yoke 47.

To relocate the meat-cutting station of FIG. 1 in relation to the working place or to move the entire cutting station from one location to the second along the track, it is rolled on the track 7 by means of the wheels 9 and the support wheel 10. After moving the cutting station into a desired location, it is locked in place by the double-acting hydraulic piston 12 which is activated so that the suction cup 15 and the pad 16 bearing on the rail 7 are pressed against the floor 13 and the rail 7 respectively.

The device according to this invention is, of course, not limited to what has been described above, nor to the performance shown in the diagrams, since it may be modified in many ways within the scope of the invention.

Several modifications of the various operating elements of the device disclosed herein are envisaged and are deemed to be within the scope of this invention. For instance, the hydraulic cylinder 17 and piston 18 can be replaced by a hydraulic motor which works in cooperation with a pinion or a screw; some of the hydraulically operated devices may be replaced with mechanical devices if desired; further, the swinging or the arcuate movement of the receiving device 20 about the axle 22 may be accomplished by means of a hydraulic motor or equivalent.

While the invention disclosed herein is described with specific reference to a meat-cutting station located along a conveyor track in a slaughterhouse, other applications of the invention are conceivable wherever transporting heavy workpieces or loads along a conveyor is involved, and work has to be performed on selected workpieces at selected locations without hindering the flow of workpieces on the conveyor to other locations.

I claim:

1. Meat-cutting apparatus for use in a slaughterhouse, said apparatus being of the type for use with equipment where carcasses are transported suspended on hooks along a conveyor track using rollers, and where meat is cut at a wayside meat-cutting station from a carcass which is taken off the conveyor track which has thereon other carcasses, said apparatus comprising:

A. a stand member which can be immovably mounted at a wayside station where meat is to be cut from a carcass;

B. an elongated receiving device which cantilevers substantially horizontally from said stand member, to receive and guide a carcass suspended from a hook which is adapted to be transported along the conveyor track, said receiving device having guide means to guide a received hook into a convergent locking position, and a resiliently biased locking member which automatically locks and clamps said hook in said convergent locking position, whereby said guide means conjointly with the locking member act to retain a hook which has a suspended carcass in such a manner as to prevent dislodging of the hook from said locking position in any horizontal direction and in a vertically downward direction; and C. pivot means to allow an arcuate movement of said receiving device about a vertical axis at the cantilevered end of the elongated receiving device, whereby the receiving device with the locked hook having the carcass suspended therefrom can be swung away from the conveyor track for cutting meat so that other carcasses on hooks can travel on the conveyor track to other wayside stations unobstructed.

2. Apparatus as in claim 1 including means to impart controlled up-and-down movement to said receiving device, so that a carcass for cutting may be lifted off the conveyor track by the receiving device, before swinging the receiving device aside.

3. Apparatus as in claim 1 wherein said pivot means to cause arcuate movement of said receiving device comprises a bearing.

4. Apparatus as in claim 2 wherein the means to impart up-and-down movement comprises a hydraulic cylinder actuating a piston which conveys vertical movement to said receiving device substantially at the cantilevered end thereof.

5. Apparatus as in claim 2 wherein said means to impart up-and-down movement to said receiving device comprises a two-way hydraulic cylinder.

6. Apparatus as in claim 4 which includes a set of rollers moving in vertical channel guides, for facilitating the up-and-down movement of said receiving device.

7. Apparatus as in claim 1 wherein a hook carrying the carcass has an attached yoke-member from which the hook depends, and wherein said means to grip includes a cantilevered bar members which generally extend substantially horizontally in the direction of the elongated receiving device, the bar members being so disposed as to guide the yoke member of a hook towards the fixed ends of the cantilevered bar members into a gripping position, where the yoke member is gripped.

8. Apparatus as in claim 7 wherein the cantilevered bar members include first and second bars which grip the yoke member in its gripping position, and a third bar which supports a bottom portion of the yoke member.

9. Apparatus as in claim 7 which further includes a locking plate which is movable between a first position, and a second locking position wherein the locking plate restricts the yoke member from being dislodged from its gripping position.

10. Apparatus as in claim 9 wherein said locking plate can be locked in its said second position by means of a hydraulically operated locking pin.

11. Apparatus as in claim 10 wherein said locking plate is spring-biased to a pivoted locking position.

12. Apparatus as in claim 7 which includes a horizontal disc member fastened to said cantilevered bar members at their fixed end, said disc being pivoted at its center, provided with means to allow rotary movement about an axis through the center of the disc, whereby the disc together with the bar members and the yoke member gripped thereby can be given rotary movement about the axis of the disc.

13. Apparatus as in claim 12 including hydraulically operated means to lock the disc in any desired position.

14. In meat-cutting apparatus of the type where carcasses are transported suspended on hooks along a conveyor track using rollers, and meat is cut selectively at wayside meat-cutting stands from a carcass which is taken off the conveyor, a meat-cutting stand comprising:

A. a vertical stand-member which can be immovably located at the conveyor track;

B. a receiving device which is supported by said vertical stand member, to receive a carcass suspended from a hook which is adapted to be transported along the conveyor track, the hook having a yoke member from which it depends, the yoke member having two side faces and a bottom face, said receiving device having first and second spaced cantilevered guide bars which in use guide the yoke member into a divergent space between free ends of the first and second bars, the cantilevered guide bars gripping said side faces of the yoke member at the region of the fixed ends of said cantilevered guide bars, said receiving device having a third cantilevered bar extending substantially in the direction of the first and second bars and in use supporting the yoke member on its said bottom face; and C. pivot means to permit an arcuate movement of said receiving device about a vertical pivot so disposed that the free ends of the first, second and third guide members are substantially at the perimeter of the arcuate movement, whereby the receiving device can grip the carcass firmly at the yoke member and swing the carcass away from the conveyor track.

15. Apparatus as in claim 14 including means to impart controlled up-and-down movement to said receiving device.

16. Apparatus as in claim 14 which includes a disc member which is immovably fastened on its face to at least the first and second guide bars at their fixed ends.

17. Apparatus as in claim 16 wherein said disc is pivoted for arcuate movement about its axis, the apparatus including means to cause arcuate movement of said disc, and a device to lock the disc in any desired position.

18. Apparatus as in claim 16 wherein the disc includes a peripheral slot adapted to receive the cross-section of the yoke member.

19. Apparatus as in claim 18 further including an elongated locking plate which is pivoted at one end thereof coaxially with said disc, said plate having a recess at a long side thereof, the recess being so shaped as to accommodate and lock the cross-section of said yoke member.

20. Apparatus as in claim 19 including means to lock the locking plate in the position where it can lock the cross-section of said yoke member.

21. Apparatus as in claim 20 wherein said means to lock the locking plate comprises a hydraulically operated pin which enters aligned holes in said disc and said locking plate, thereby preventing relative movement therebetween.

22. Apparatus as defined in claim 8, including a horizontal disc member fastened to said cantilevered bars at their fixed end, said disc being provided with means to cause rotational movement thereof about its own axis, whereby the disc together with said cantilevered bars and the yoke member along with a carcass can be given rotational movement along the disc axis.

23. Apparatus as defined in claim 22 including means to lock said disc in one of a plurality of rotary positions.

24. Apparatus as defined in claim 23 wherein said locking means comprises a hydraulically operated pin engaging one of a plurality of radially inward holes provided on the disc periphery.

* * * * *